United States Patent
Zeira et al.

(10) Patent No.: US 6,940,651 B2
(45) Date of Patent: Sep. 6, 2005

(54) DURABLE NANO-STRUCTURED OPTICAL SURFACE

(76) Inventors: Eitan Zeira, 31 Mill Rd., Hollis, NH (US) 03049; Lee Batchelder, 2 James St., Derry, NH (US) 03038; Louis M. Scarmoutzos, 340 Main St., Melrose, MA (US) 02176

(*) Notice: Subject to any disclaimer, the term of this patent is extended or adjusted under 35 U.S.C. 154(b) by 0 days.

(21) Appl. No.: 10/746,070

(22) Filed: Dec. 24, 2003

(65) Prior Publication Data

US 2004/0137221 A1 Jul. 15, 2004

Related U.S. Application Data

(60) Provisional application No. 60/437,208, filed on Dec. 30, 2002.

(51) Int. Cl.⁷ .................. G02B 1/10; G02B 15/00; B05D 5/06
(52) U.S. Cl. .................. 359/580; 359/884; 359/642; 427/162; 427/164
(58) Field of Search .................. 359/642, 223, 359/263, 884, 580–584; 428/141, 411, 212, 213, 143, 323, 169, 333, 426, 480, 474.4; 427/162, 164, 169, 430.1

(56) References Cited

U.S. PATENT DOCUMENTS

| | | | |
|---|---|---|---|
| 3,986,997 A | 10/1976 | Clark | 524/300 |
| 4,027,073 A | 5/1977 | Clark | 428/412 |
| 4,049,868 A | 9/1977 | Laurin et al. | 428/412 |
| 4,186,026 A | 1/1980 | Rotenberg et al. | 106/287.14 |
| 4,191,804 A | 3/1980 | Weber | 428/409 |
| 5,181,141 A * | 1/1993 | Sato et al. | 359/580 |
| 5,476,717 A | 12/1995 | Floch | 428/421 |
| 5,699,189 A * | 12/1997 | Murphy | 359/601 |
| 5,935,717 A | 8/1999 | Oishi et al. | 428/1.51 |
| 6,040,378 A | 3/2000 | Sanduja et al. | 524/588 |
| 6,172,812 B1 * | 1/2001 | Haaland et al. | 359/589 |
| 6,243,203 B1 * | 6/2001 | Schleipen et al. | 359/581 |
| 6,497,957 B1 * | 12/2002 | Border et al. | 428/402 |
| 6,528,142 B2 * | 3/2003 | Ikegaya et al. | 428/141 |

OTHER PUBLICATIONS

Chan et al., Ordered Bicontinuous Nanoporous and Nanorelief Ceramic Films From Self Assembling Polymer Precursors, Scient 25 Nov. 199, vol. 286.

* cited by examiner

*Primary Examiner*—Georgia Epps
*Assistant Examiner*—M. Hasan

(57) ABSTRACT

The durability and abrasion resistance of nano-structured optical surfaces, particularly those formed of or on polymeric substrate, are enhanced by at least one of adhering to it a fluorinated carbon molecule or other reactive lube composition as a monolayer coating (or a thin and substantially uniform multi-layer coating) and by treatment with a surface-active cross-linking agent.

18 Claims, 2 Drawing Sheets

DURABLE NANO-STRUCTURED OPTICAL SURFACE

CROSS REFERENCE TO RELATED APPLICATIONS

This application claims priority to the provisional patent application having Ser. No. 60/437,208 and filed on Dec. 30, 2002.

BACKGROUND OF INVENTION

The present invention relates to a method of imparting improved durability and abrasion resistance nano-structured optical surfaces, and more particularly to those formed from or on polymeric substrates or other optical elements or articles.

Most polymeric materials when used in a "mechanically harsh" environment (i.e. abrasion, or recurring impact) quickly wear away their usefulness. A method of coating these articles with "hardcoats" to impart robustness has been shown (e.g. hardcoated ophthalmic lenses, polymeric windows and laminates) to greatly improve useful life of the polymeric article (among others, U.S. Pat. Nos. 3,700,487; 4,049,868; 4,137,365; 4,611,892; 5,619,288 and 5,958,514.) In most applications were the polymeric material has some optical function, an anti-reflection (AR) coating is also required. It relies on a nano structure to create a Graded Refractive Index (GRIN) reduction to minimize reflection. This type of structure is well known and relies on the moths' eye principle (Bernard, C. G., Endeavor 26, pp. 79–84 (1967)).

However, the ideal or optimum GRIN structure is inherently mechanically unstable (i.e. foam like structure), and can be easily worn away with mild abrasion.

Numerous patents have been granted (for example see U.S. Pat. Nos. 2,445,238; 2,432,484; 3,490,982; 4,816,333; 4,374,158; 4,013,465; 4,114,983; 4,753,516 and 6,040,053) which have demonstrated that imparting a nanostructure to a surface dramatically reduced back reflection of visible light from it. However, none of these anti-reflective techniques produced a durable coating (Cathro et al. in "Silica Low-Reflection Coatings for Collector Covers by a Dye-Coating Process," Solar Energy, Vol. 32, No. 5, pp. 573–579 (1984); and by J. D. Masso in "Evaluation of Scratch Resistant and Anti-reflective Coatings for Plastic Lenses," Proceedings of the 32$^{nd}$ Annual Technical Conference of the Society of Vacuum Coaters, Vol. 32 p. 237–240 (1989)).

Lange et al. U.S. Pat. No. 4,816,333 discloses anti-reflective coatings of silica particles. The coating solution contains colloidal silica particles and optionally a surfactant ("Trition.TX.X-100" and "Tergitol TMN-6") to improve the wettability of the coating solution. Tanigucki et al. U.S. Pat. No. 4,374,158 discloses an anti-reflective coating using a gas phase treatment technique. However, neither discloses the resultant abrasion resistance of their treatments. In fact, Taniguchi et al. state that a protective overcoat may be preferable with their nano-structure. They assert care should be taken not to make this layer too thin to negate the abrasion resistance, nor be made too thick to negate the AR effect.

It is therefore, an object of this invention to impart abrasion durability to a nano-structured surface. Among others, this invention can furnish mechanical durability (such as scratch, wear, and impact resistance) to an optical element that has a Moths' Eye type antireflection treatment on its surface.

It is another object of the invention to provide a process that can impart low surface energy properties to an optical element without difficulty and complication of process.

It is another object of the present invention to provide a method of imparting lubricity to an article that uses a nano-structure for its functionality (e.g. microdisplays, sensors, LEDs, memory devices, and other nano-technology devices).

SUMMARY OF INVENTION

In accordance with the present invention, there is provided a process for producing an abrasion resistant surface by, in a preferred embodiment, chemically attaching fluorocarbon molecules to it. This is accomplished by dipping the articles in a solution of reactive fluorocarbons and removing the excess unreacted molecules from its surface via the vapor degreasing method.

In a second aspect, the present invention provides a method for modifying the surface properties of a nano-structured hardcoat disposed on an optical element. In particular, it is aimed to provide it with a low surface energy property. It is surmised that the lowering of surface energy reduces the friction coefficient and thus abrasion is reduced. The modification is achieved by reacting the surface with a reactive lubricant. This affords the article the capability to have both a microscopically rough surface, as well as, abrasion resistance in a single layer.

In yet another aspect, the present invention provides a method for modifying the mechanical and surface properties of a nano-structured hardcoat disposed on an optical element. In particular, it is aimed to cross-link the nano-structured surface. It is surmised that surface cross-linking of the nano-structure enhances the mechanical durability of the optical element. The modification is achieved by reacting surface functionality present on the nano-structure surface with a surface-active cross-linking agent. This affords the article the capability of having enhanced abrasion resistance.

More specifically, the present invention seeks to furnish durability to moth eye type, anti-reflection treatments that are imparted to optical articles such as ophthalmic lenses, displays, solar cells etc. In most cases, these articles require both properties for their proper functionality (i.e. durability and anti-reflection as well a transmission increase for transparent articles).

The above and other objects, effects, features, and advantages of the present invention will become more apparent from the following description of the embodiments thereof taken in conjunction with the accompanying drawings.

DETAILED DESCRIPTION

The term "lube" in this application is generally referred to any substance that is used as a lubricant to lower the occurrence of abrasion during motion between intimately contacting surfaces. There are many lubes used for a myriad of applications, the properties and performance of different types being generally known within the applicable technology field.

The term "surface cross-linking reagent" in this application is generally referred to any substance that can react with a plurality of surface functionality present on the nano-structured surface of the optical element. The resulting interaction between the surface functionality and the surface cross-linking reagent may be covalent bonds, ionic bonds or hydrogen bonded interactions that confer additional mechanical durability to the optical element.

A sub set of lubricants called reactive lubes utilizes a long chain molecule (that can, in some instances, be considered either an oligomer or polymer) that has a reactive group (e.g. carbonyl, amine etc.) at one end of the molecule. The reactive end is chosen such as to chemically bond to a specific surface it is designed for. This in turn ensures that the attached polymer is secured to the surface and cannot be easily removed. Example of such polymers are "Krytox 157FS" from Dupont and "ZDOL-7007" from Ausimont. These types of reactive lube polymers are employed in this invention to impart durability to a nano-structured surface. A preferred subset of such reactive lubes is that in which the long chain molecule is a fluorinated molecule, in which is fluorine otherwise replaces a substantial amount of hydrogen in the equivalent long chain hydrocarbon.

The present invention can be best elucidated by way of an example of how it can be used to enhance the property of devices that rely on optical properties for their functionality. Optical articles (such as ophthalmic lenses, displays and solar cells) typically require a means of reducing back reflection for optimal performance. Creating a nano-structure on the surface of the article has been shown to provide adequate AR properties (e.g. U.S. Pat. Nos. 2,445,238; 2,432,484; 4,816,333; 4,374,158 and 4,013,465). However, the inherently weak mechanical structure affords the article insufficient durability.

Figure 1:
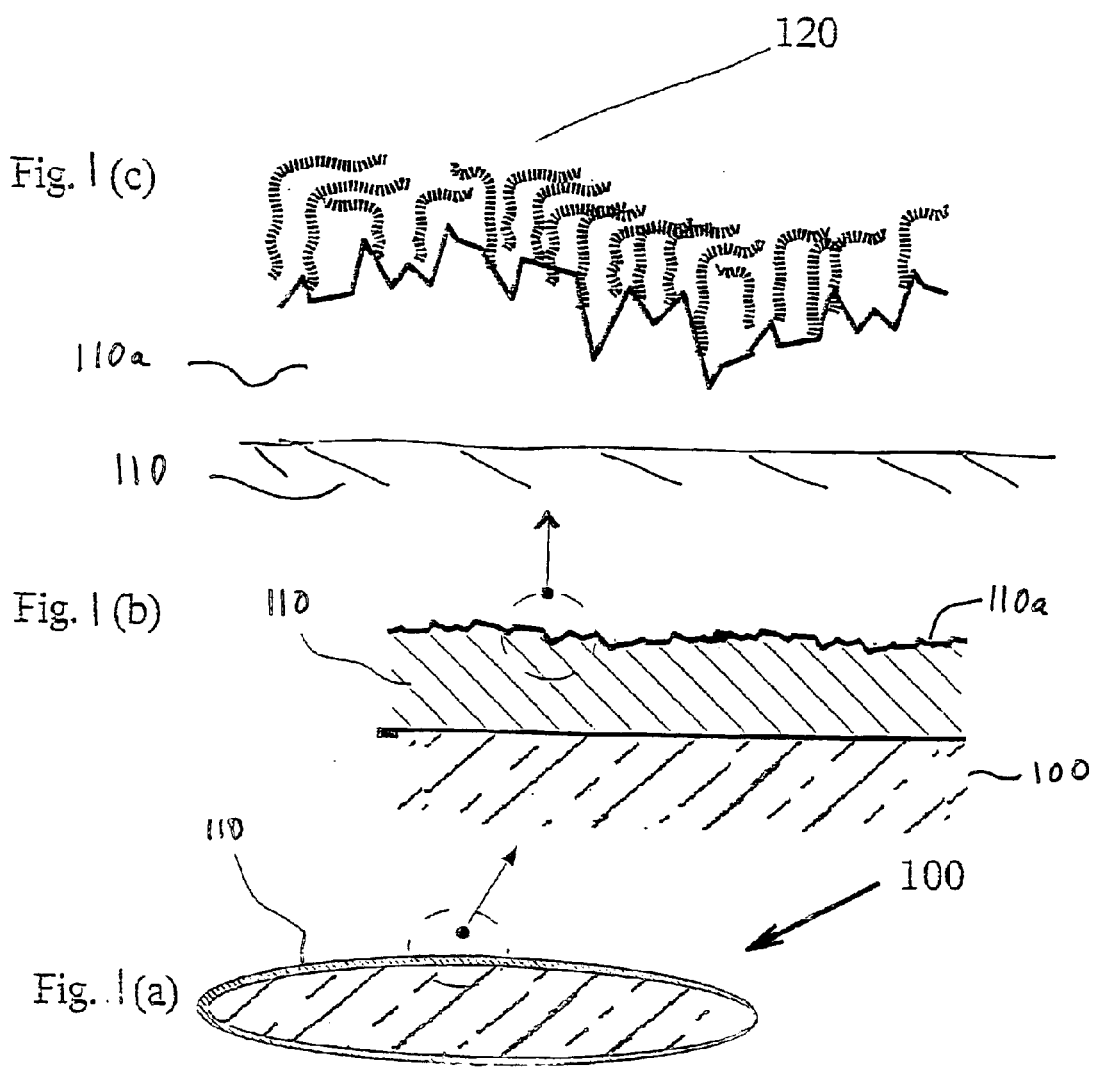
FIG. 1 is a schematic illustration of a nano-structured surface coated with a monolayer of reactive lube

Thus, FIG. 1 is a schematic illustration showing successive higher magnification cross sections from optical element or article 100 at the bottom, FIG. 1(a), having a hardcoat layer 110 in FIG. 1(b). Not wishing to be bound by theory, FIG. 1(c) illustrates conceptually the nano-structured hardcoat layer 110a coated with a monolayer of polymeric lube molecules 120 attached thereto.

Thus in one embodiment of the invention hardcoat layer 110 can be applied to the surface of an optical article 100. Hardcoat layer 110 is subsequently modified to form a nano-structured layer 110a, which has potentially a graded refractive index or a periodic variation in height with sufficient pitch to reduce reflection, and enhance transmission. However, the application of the invention also embraces such variations in nano-structured surfaces to include combinations of these structures and diffractive optical surfaces. Accordingly, in either variant the nano-structure at surfacel 110a is either at least partly porous or not as smooth as the original surface and thus more susceptible to erosion or abrasion, through either cleaning or casual contact in the environment. However, any further treatment to strengthen or protect the nano-structures surface must not interfere with the topographic profile. As the polymeric lube molecules have predicable dimension based on there molecular weight they can be selected in accordance with the nano-structure height, thickness, porosity, refractive index or and pitch variation so that the monolayer substantially conforms with the nano-structure relief, thus avoiding detracting from the optical properties provided by the nano-structure. As will be further described, the reactive lube molecules 120 are limited to a monolayer, each molecule preferably anchored at one end by a chemical reaction with the surface 110a, having the opposite end extending away from the surface to provide lubrication that increase the wear resistance and durability of the otherwise fragile nano-structured surface.

The choice of specific reactive lube is made in made in consideration of the reactivity and functional groups that may be present on the nano-structured surface of the optical article or device, as well as the necessary times and conditions of reaction. The optical article is preferably coated with the monolayer by dip coating in a solution of solvent with this reactive lube followed by slow withdrawn through a vapor cloud of that solvent. This process ensures that the article is densely covered with a single molecular layer of the reactive lube. All the excess unreacted lube flows back to the solution during passage through the vapor cloud. The remaining lube is essentially a monolayer, having become anchored to the surface by a chemical reaction of on end of the molecule with the surface. Thus, the remaining end of the molecule is free to at least partially extend from the surface. The free end provides the lubrication of tribological modification while being of limited length and constrained avoiding a significant alteration of the surface topography of the nano-structure. In other words the anti-reflection property is unaffected by the presence of a monolayer uniformly covering the surface.

In an alternative embodiment of the invention excess reactive lube is removed after the lens or optical element is removed from the reactive lubricant solution (or other solution coating methods, such as spray coating, curtain coating, spin coating and the like) by placing it in pure solvent solution such that excess, un-reacted lube is removed by dissolution in the solvent used as a rinse bath. As the solvent rinsing solution will eventually accumulate the excess reactive lube, a further preference is to use a series or so-called "cascade" of rinse baths, each in a progressively purer solvent.

The following is a more specific example of how this invention may be used in conjunction with a nano-structured surface to afford articles both AR and durability.

To produce the AR effect, a hard-coated optical article is dipped in an aqueous or alcoholic solution of an alkali such as Sodium Hydroxide. The concentration of the etchant is preferably from 2%–30% by weight and more preferably between 5% and 15%. The treatment time is from 2 minutes to one hour at 10° C. to 40° C., and more preferably at room temperature.

If the optical article does not have a hardcoat, one must be coated onto the article by any method known to one skilled in the art prior to the etching step.

If treated correctly, the polymeric or inorganic optical devices exhibit reflectance as low as 0.1%, and a relatively low uniform reflectivity throughout the visible region (380–700 nm). In contrast, untreated polymeric devices with or without a hardcoat typically exhibit reflectance about 4% from each surface.

Figure 2:
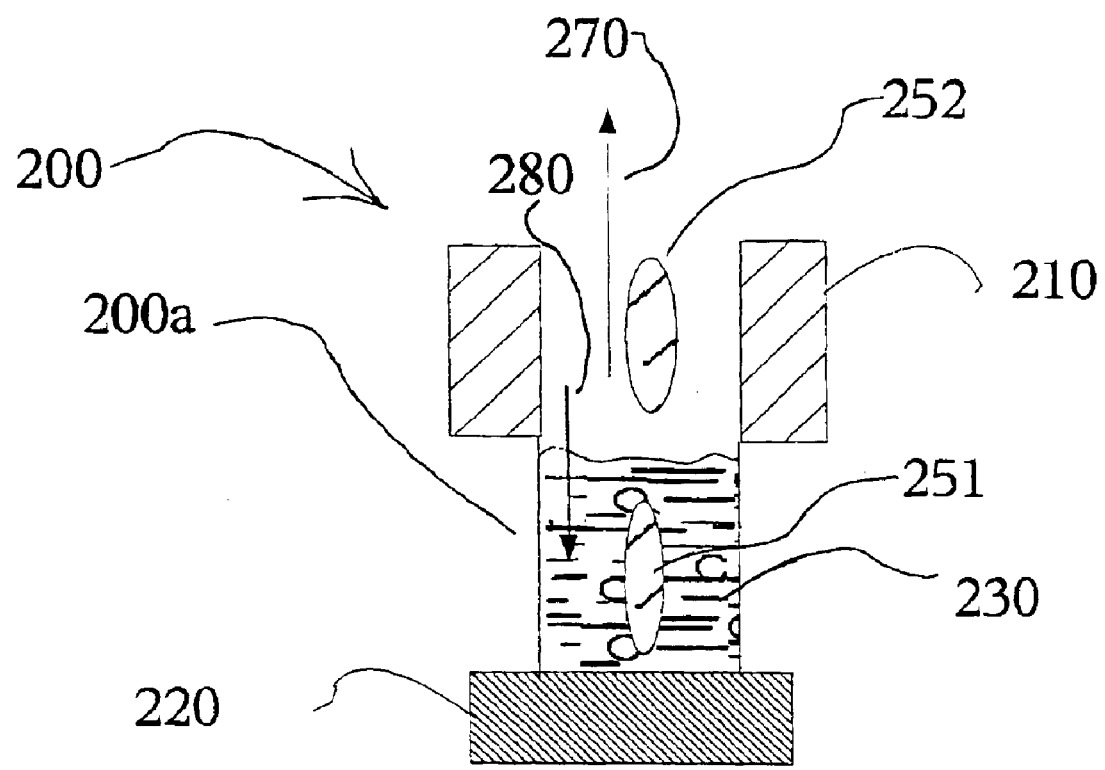
FIG. 2 is a schematic illustration of an apparatus used in one embodiment of a method of applying a monolayer of reactive lube to an article.

The article is then dipped into a reactive lube solution comprising 1% (w/w) of "ZDOL-7007" (Ausimont USA, Inc., 10 Leonards Lane, Thorofare, N.J. 08086) dissolved in "HFE-7100" a (3M Performance Materials, 223 Portsmouth, N.H. 03801.), a fluorinated hydrocarbon solvent. As illustrated in FIG. 2 the vessel 200 is equipped with a chiller ring 210 above the vessel opening and has a means of being heated, schematically illustrated as element 220 beneath vessel 200. The solution 230 is heated to a temperature of about 40° C. The chilling coil 210 above the fluid containing portion 200a of vessel 200 condenses the solvent, vapors back into the vessel thus creating a uniform vapor cloud above the solution surface in the region surrounding lens 252. The AR or nano-structured article, for example a lens 251, is then immersed into the heated solution, such as by lowering it along arrow 270. Next lens 251 is slowly withdrawn, as indicated by arrow 280, at a constant rate (circa ~1"/min.). This sequence results in a monolayer of the lube deposited on the nano-structured surface, as the condensation of solvent vapor on the lens after withdrawal re-dissolves excess reactive lubricant, which is before the reaction with the surface or other lube molecules is completed.

While the present invention is applicable to any nano-structured surface that suffers from poor mechanical durability it is particularly useful in the treatment of nano-structured polymeric surfaces, as these structures can be quite delicate depending on the process used to form the surface. For example, although it is possible to form nano-structure polymer surfaces by molding and embossing, etching via mechanical or chemical attach is a commercially attractive method of modifying optical surfaces, as it is independent of the method used to produce the primary, which is image forming, optical surface.

An alternative embodiment of the present invention entails surface cross-linking of the nano-structured optical element. Moreover, if additional mechanical durability is desired or warranted, the resulting cross-linked nano-structure surface may be further treated with a lube agent.

Surface cross-linking of the nano-structure may be achieved by treatment with polyvalent ions such as $Ca^{+2}$, $Mg^{+2}$, $Fe^{+3}$, $Al^{+3}$, and related ions, which may form ionic or hydrogen-bonded bridges that are capable of spanning several silanol or surface active functional groups.

Cross-linking may also be achieved by the judicial selection and employment of polyfunctional reactive molecules. A monolayer or relatively thin multilayer of polyfunctional organic molecules or organometallic molecules capable of chemically reacting with a plurality of appropriate surface functionality on the nano-structure surface such as, surface silanols or other surface active functional groups that may be present depending upon the nano-structure optical element.

It has also been discovered (Examples 1 and 2) that chemical hardcoats used on ophthalmic lens can be etched in alkali solutions to provide a nano-structure having superior anti reflective properties, however this treatment reduces the durability with respect to the hardness and scratch resistance afforded by the hardcoat itself. Significantly, upon treatment according to the teachings of the instant invention the application of a surface-active cross-linking agent and or monolayer of reactive lube has been found to restore the hardness and scratch resistance otherwise lost in an alkali etching process.

The present invention is thus a significant improvement over prior art polymeric optical elements in both anti-reflection and mechanical durability. Furthermore, it is a cost effective as well as simple method to implement in providing durable AR coatings for optical articles.

EXAMPLE 1

A 10% NaOH etch solution (w/w) is prepared by dissolving 50.0 g of NaOH (Reagent Grade Sodium Hydroxide) in 450.0 grams of anhydrous methanol (MeOH, 568.5 mL) plus 20.0 mL of deionized water (d. $H_2O$). A hardcoated optical lens (Silor TruTint® Lens; Silor, Division of Essilor of America, Inc., St. Petersburg, Fla.) is suspended in the NaOH etch solution for a period of 10 minutes at 21° C., after which time the lens is removed, rinsed with methanol and dried with a heat gun. Optical reflectance (450–750 nm) of the lens after etch treatment was <0.5% (optical reflectance of the untreated lens was 5.5%).

EXAMPLE 2

A 10% NaOH etch solution (w/w) is prepared by dissolving 50.0 g of NaOH (Reagent Grade Sodium Hydroxide) in 450.0 g of anhydrous methanol (MeOH, 568.5 mL) plus 20.0 mL of deionized water (d. $H_2O$). A hardcoated optical lens (SOLA Lens; SOLA International Holdings Ltd, Lonsdale, South Australia) is suspended in the NaOH etch solution for a period of 20 minutes at 21° C., after which time the lens is removed, rinsed with methanol and dried with a heat gun. Optical reflectance (450–750 nm) of the lens after etch treatment was <0.5% (optical reflectance of the untreated lens was 5.0%).

EXAMPLE 3

A fluorolube coating solution is prepared as follows: 4.01 g of Fomblin® Z-DOL (a fluorocarbon lubricant from Solvay Solexis, Inc., formerly Ausimont USA, Inc.) is dissolved in 396.21 g of HFE-7100 Solvent (3M Novec™ Engineered Fluid, $C_4F_9OCH_3$). An etched Silor lens prepared in accordance to Example 1 is suspended in the fluorolube solution for a period of 10 minutes at 21° C., after which time the lens is removed, rinsed with HFE-7100 Solvent and air-dried. A minimal change in lens reflectance (<0.3%) was observed after the fluorolube treatment. Scratch or rub resistance (using a heavy gauge white cloth) of the fluorolube treated lens improved as compared to the etched only lens (with heavy gauge white cloth wrapped around the index finger, and rubbed across the surface of the lens three times in three different areas: Fluorolube treated lens: no visual rub marks, Etched-Only lens: visual rub marks after three rubs).

EXAMPLE 4

A fluorolube treatment solution is prepared as follows: 1.0 g of Fluorolink™ 7007 (a fluoropolyether derivative from Solvay Solexis, Inc., formerly Ausimont USA, Inc.) is dissolved in 94.0 g isopropanol (i-PrOH), 4.0 g deionized water (d. $H_2O$) and 1.0 g Glacial Acetic Acid (AcOH). An etched Silor lens prepared in accordance to Example 1 is suspended in the fluorolube solution for a period of 5 minutes at 21° C., after which time the lens is removed, rinsed with ethanol and then dried with a heat gun. The lens was then oven cured at 100° C. for 30 minutes. A minimal change in lens reflectance (<0.5%) was observed after the fluorolube treatment. Scratch or rub resistance (using a heavy gauge white cloth) of the fluorolube treated lens improved as compared to the etched only lens (with heavy gauge white cloth wrapped around the index finger, and rubbed across the surface of the lens three times in three different areas: Fluorolube treated lens: no visual rub marks, Etched-Only lens: visual rub marks after three rubs).

EXAMPLE 5

A fluorosilane treatment solution is prepared as follows: 2.0 g of (tridecafluoro-1,1,2,2,-tetrahydrooctyl)-triethoxysilane (a reactive organofluorosilane from Gelest, Inc.; $CF_3(CF_2)_5CH_2CH_2Si(OEt)_3$) is dissolved in 98.0 g of ethanol (EtOH). The resulting solution is then adjusted to pH 4.5 using glacial acetic acid (approx. 0.3–0.5 mL). An etched Silor lens prepared in accordance to Example 1 is suspended in the fluorosilane treatment solution for a period of 5 minutes at 21° C., after which time the lens is removed, rinsed with ethanol and then dried with a heat gun. The lens is then oven cured at 110° C. for 15 minutes. A minimal change in lens reflectance (<0.5%) was observed after the fluorosilane treatment. Scratch or rub resistance (using a heavy gauge white cloth) of the fluorosilane treated lens improved as compared to the etched only lens (with heavy gauge white cloth wrapped around the index finger, and rubbed across the surface of the lens three times in three different areas: Fluorosilane treated lens: no visual rub marks, Etched-Only lens: visual rub marks after three rubs).

EXAMPLE 6

A 20% (w/w) aqueous calcium chloride solution is prepared by dissolving 20.0 g of $CaCl_2$ in 80.0 mL of deionized water (d. $H_2O$). An etched Silor lens prepared in accordance to Example 1 is rinsed with 10% HCl (aq.) followed by rinsing with d. $H_2O$ and then suspending in the 20% $CaCl_2$ (aq.) for a period of 15 minutes at 21° C., after which time the lens is removed, rinsed with d. $H_2O$ and then dried with a heat gun. The lens is then oven cured at 110° C. for 15 minutes. A minimal change in lens reflectance (<0.2%) was observed after the calcium treatment. Scratch or rub resistance (using a heavy gauge white cloth) of the calcium treated lens improved as compared to the etched only lens (with heavy gauge white cloth wrapped around the index finger, and rubbed across the surface of the lens three times in three different areas: Calcium treated lens—no visual rub marks, Etched-Only lens: visual rub marks after three rubs).

EXAMPLE 7

A fluoropolymer treatment solution is prepared as follows: 1.0 g of FluoroPel™ PFC802A (a 2.0% fluoroaliphatic polymer dissolved in a fluorosolvent, from Cytonix Corp.) is dissolved in 99.0 g of HFE-7100 Solvent (3M Novec™ Engineered Fluid, $C_4F_9OCH_3$). An etched SOLA lens prepared in accordance to Example 2 is suspended in the fluoropolymer treatment solution for a period of 5 minutes at 21° C., after which time the lens is removed, rinsed with HFE-7100 Solvent and then air-dried. The lens is then oven cured at 50° C. for 15 minutes followed by an additional cure at 90° C. for 15 minutes. An increase in lens reflectance (approx. 1–2%) was observed after the fluoropolymer treatment. Scratch or rub resistance (using a heavy gauge white cloth) of the fluoropolymer treated lens improved as compared to the etched only lens (with heavy gauge white cloth wrapped around the index finger, and rubbed across the surface of the lens three times in three different areas: Fluoropolymer treated lens: no visual rub marks, Etched-Only lens: visual rub marks after three rubs).

Accordingly, one of ordinary skill in the art will select a surface cross-linking agent and or reactive lube based in part on the reactivity to the surface group on the optical article, taking into account the compatibility of the size or long chain portion of the molecule with the substrate chemistry, preferably trying to maximize the durability of the nano-structure surface and minimize the difference in refractive index between the "fluid" like monolayer and the substrate it is disposed on or reacted with.

While the invention has been described in connection with a preferred embodiment, it is not intended to limit the scope of the invention to the particular form set forth, but on the contrary, it is intended to cover such alternatives, modifications, and equivalents as may be within the spirit and scope of the invention as defined by the appended claims.

What is claimed is:

1. A process for enhancing the durability of an article having a nano-structured surface to improve transmission or reduce reflection, the process comprising:
   a) providing an article having a nano-structured optical surface,
   b) applying a solution formed of a solvent and a reactive lube,
   c) withdrawing the article from the solution source,
   d) removing excess reactive lube from the article such that a substantially uniform layer of reactive lube remains on the surface,
   e) wherein the layer of reactive lube has the opportunity to chemically react with the nano-structured surface.

2. A process for enhancing the durability of an article having a nano-structured surface to improve transmission or reduce reflection according to claim 1 wherein the uniform layer is a monolayer.

3. A process for enhancing the durability of an article having a nano-structured surface to improve transmission or reduce reflection according to claim 1 wherein the reactive lube is a fluoroaliphatic polymer.

4. A process for enhancing the durability of an article having a nano-structured surface to improve transmission or reduce reflection according to claim 3, the process further comprising:
   a) applying a solution formed of a solvent and a reactive lube, withdrawing the article from the solution source,
   b) removing excess reactive lube from the article such that a substantially uniform layer of reactive lube remains on the surface,
   c) wherein the layer of reactive lube has the opportunity to chemically react with the nano-structured surface.

5. A process for enhancing the durability of an article having a nano-structured surface to improve transmission or reduce reflection according to claim 1 wherein the reactive lube is a fluorosilane polymer.

6. A process for enhancing the durability of an article having a nano-structured surface to improve transmission or reduce reflection according to claim 1 wherein the solvent is a fluorosolvent.

7. A process for enhancing the durability of an article having a nano-structured surface to improve transmission or reduce reflection, the process comprising:
   a) providing an article having a nano-structured optical surface,
   b) applying a solution formed of a solvent with a surface cross-linking reagent,
   c) withdrawing the article from the solution source,
   d) removing excess surface cross-linking reagent from the article,
   e) wherein the surface-active cross-linking agent has the opportunity to chemically react with the nano-structured surface.

8. A process for enhancing the durability of an article having a nano-structured surface to improve transmission or reduce reflection according to claim 7 wherein the cross-linking agent is a polyvalent ion.

9. A process for enhancing the durability of an article having a nano-structured surface to improve transmission or reduce reflection according to claim 8 wherein the polyvalent ion is selected from the group consisting of $Ca^{+2}$, $Mg^{+2}$, $Fe^{+3}$ and $Al^{+3}$.

10. A transparent optical element consisting essentially of:
   a) a transparent body having a front surface, the front surface of the transparent body having a nano-structure to reduce reflection there from and increase overall transmission through the optical element,
   b) a substantially uniform layer of reactive lube is disposed on the front surface of the transparent body; and wherein the average optical reflection from 450–750 nm is less than about 4%.

11. A transparent optical element according to claim 10 wherein the reactive lube is a monolayer.

12. A transparent optical element according to claim 10 wherein the average optical reflection from 450–750 nm is less than about <0.2%.

13. A transparent optical element according to claim 10 wherein the average optical reflection from 450–750 nm is less than about <0.5%.

14. A transparent optical element according to claim 10 wherein the average optical reflection from 450–750 nm is less than about <2.0%.

15. A transparent optical element according to claim 14 wherein the transparent body is a lens.

16. Transparent optical element according to claim 14 wherein the transparent body is a plastic resin.

17. A transparent optical element according to claim 10 wherein the average optical reflection from 450–750 nm is less than about <0.5%.

18. A transparent optical element according to claim 17 wherein the transparent body is a plastic ophthalmic lens.

* * * * *